Figure 1:
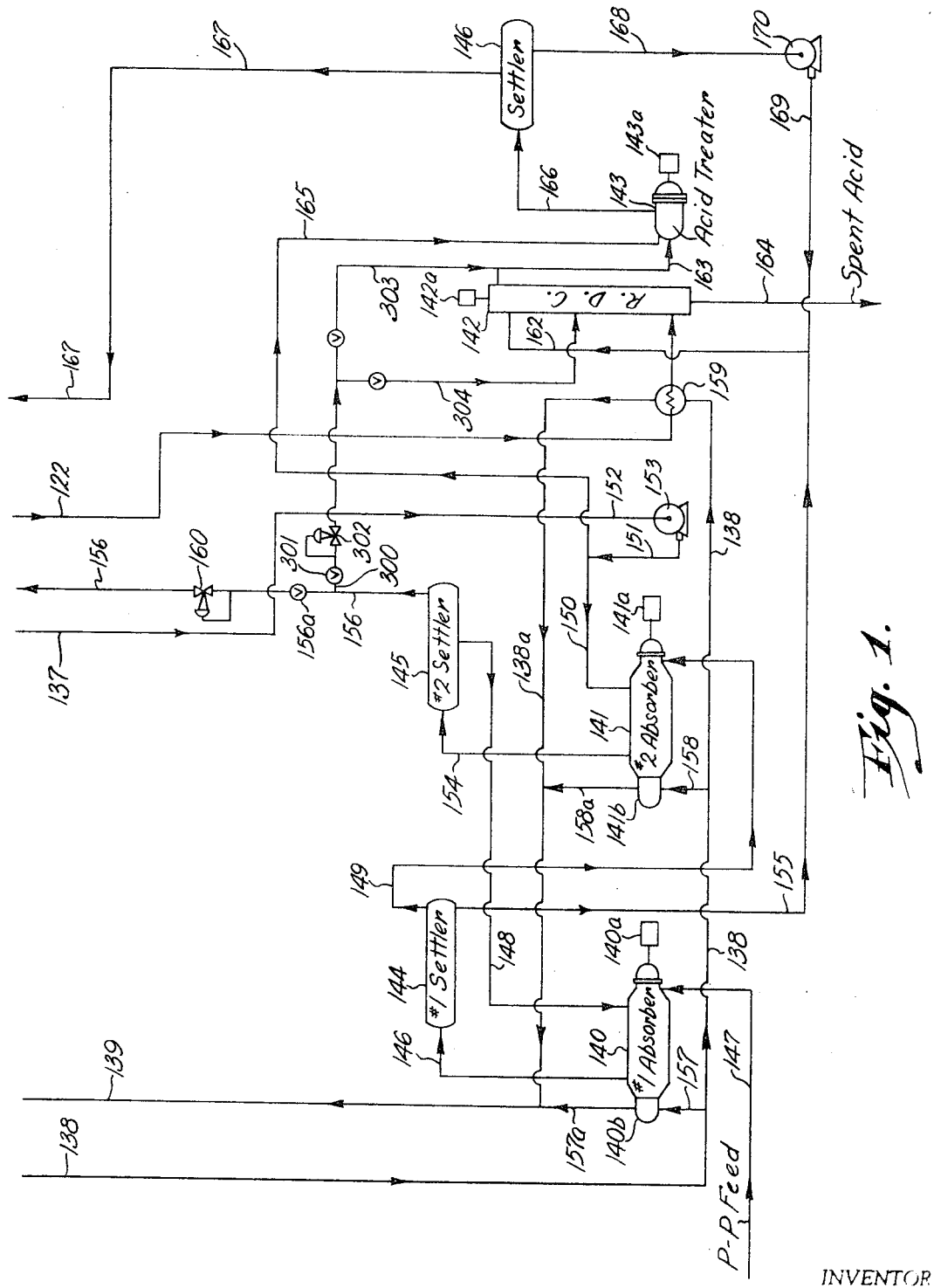

United States Patent
McGovern et al.

[15] 3,665,050
[45] May 23, 1972

[54] ALKYLATION OF DIALKYL SULFATE OBTAINED FROM AN OVERHEAD ABSORPTION PHASE

[72] Inventors: Louis J. McGovern, Prairie Village; Charles L. West, Shawnee Mission; Orlando Webb, Prairie Village, all of Kans.

[73] Assignee: Stratford Engineering Corporation, Kansas City, Mo.

[22] Filed: Apr. 21, 1969

[21] Appl. No.: 817,535

[52] U.S. Cl. ..........................260/683.62, 260/683.61
[51] Int. Cl. ..............................................C07c 3/54
[58] Field of Search ..............260/683.59, 683.61, 683.62

[56] References Cited

UNITED STATES PATENTS

| | | | |
|---|---|---|---|
| 2,320,336 | 6/1943 | Bruner et al. | 260/683.61 |
| 2,906,797 | 9/1959 | Beavon et al. | 260/683.61 |
| 3,428,705 | 2/1969 | Goldsby | 260/683.62 |
| 3,462,512 | 8/1969 | Goldsby | 260/683.61 |
| 3,502,742 | 3/1970 | Goldsby | 260/683.61 |

Primary Examiner—Delbert E. Gantz
Assistant Examiner—G. J. Crasanakis
Attorney—Scofield, Kokjer, Scofield & Lowe

[57] ABSTRACT

Combination process for the alkylation of isoparaffin with olefinic material in the presence of sulfuric acid alkylation catalyst wherein olefin hydrocarbon is reacted with used acid catalyst in an absorption zone producing a lighter overhead phase comprising unreacted hydrocarbon together with a portion of the dialkyl sulfate thus formed, and a heavier acid-alkyl sulfate phase comprising the remainder of the dialkyl sulfate. The dialkyl sulfate content of the heavier phase is extracted with isoparaffin being alkylated and the extract solution is passed to an alkylation reactor. The lighter phase from the absorption zone is reacted with isobutane in a different alkylation reactor, optionally in the presence of an additional quantity of the same type olefin reacted to form the dialkyl sulfate.

2 Claims, 3 Drawing Figures

INVENTOR
Louis J. McGovern
Charles L. West
Orlando Webb

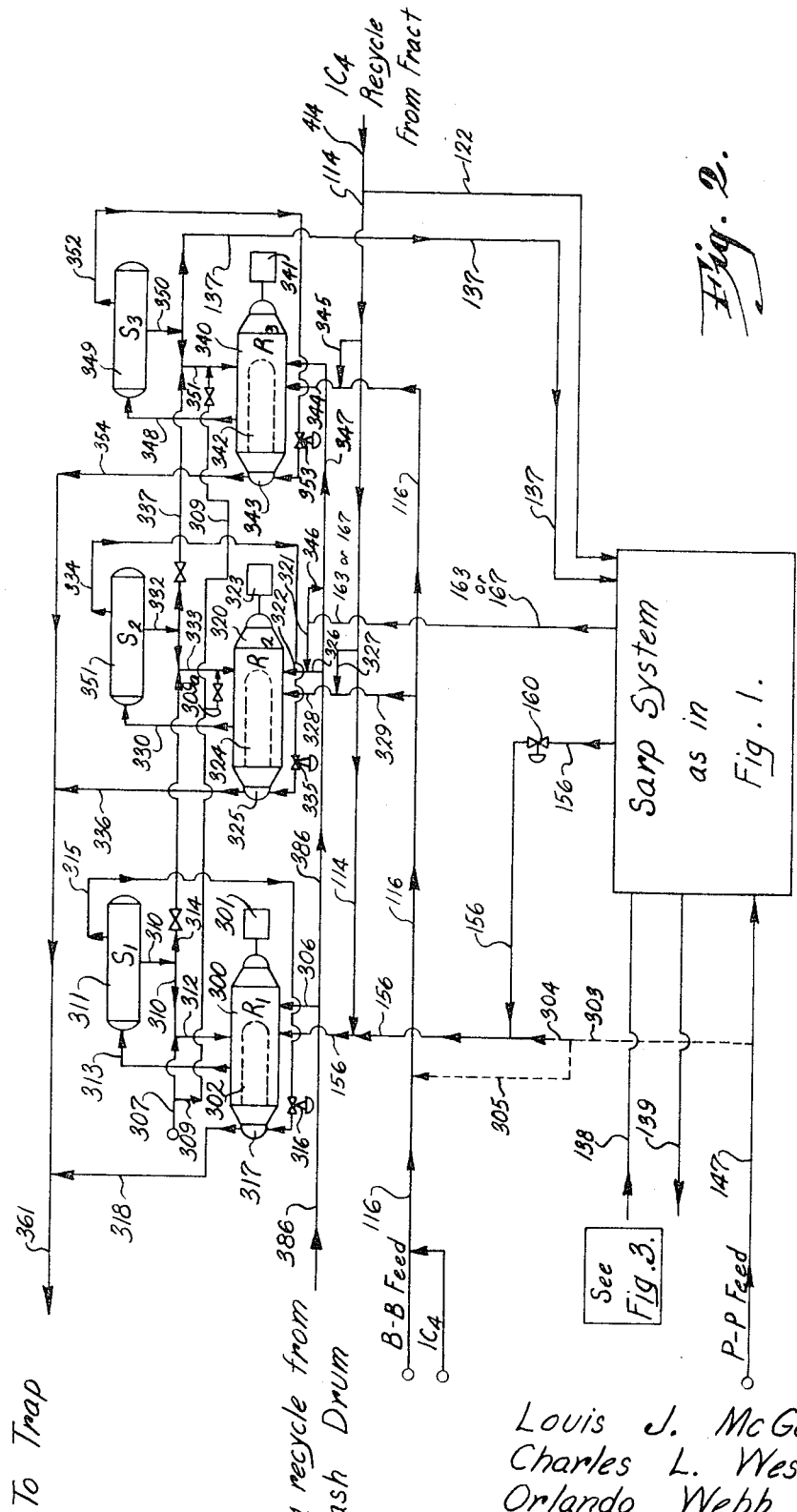

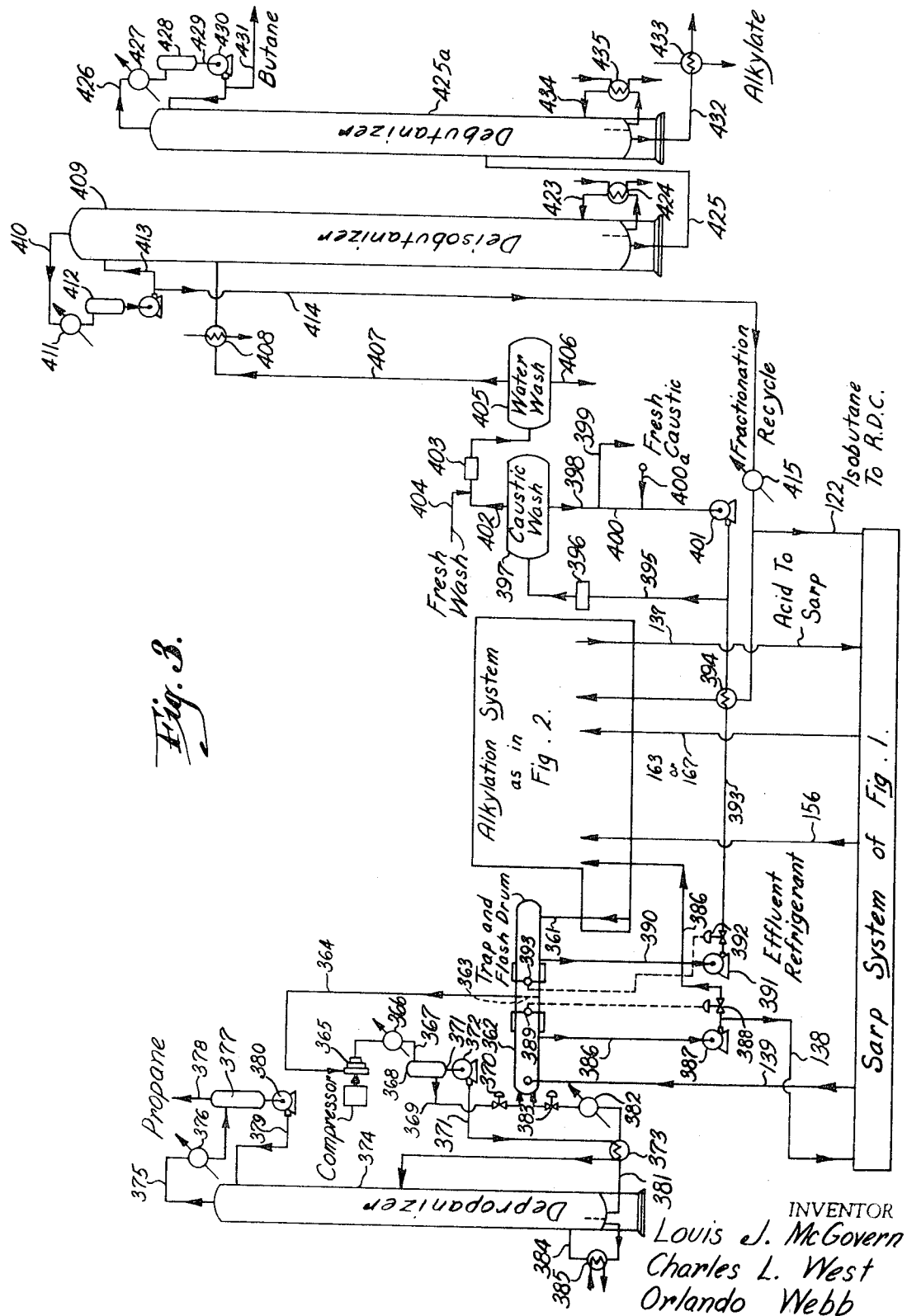

ALKYLATION OF DIALKYL SULFATE OBTAINED FROM AN OVERHEAD ABSORPTION PHASE

In H. E. Massa, Ser. No. 495,191 "Alkylation of Alkyl Sulfates," filed Oct. 12, 1965, therein is shown methods of and apparatus for absorbing olefins, particularly propylene, into acid streams from the settler or settlers of an alkylation reaction system. The absorption process is so operated and manipulated via apparatus and process conditions as to produce dialkyl sulfates or dipropyl sulfate (DIPS) which, after removal of catalyst contaminants therefrom are recycled to the alkylation reaction zone for transformation into alkylate with the freeing of sulfuric acid. A sufficient excess of olefins or propylene is employed in the absorption step that an overhead from the absorption stage back to the alkylation reaction zone carries some DIPS, excess propylene and propane.

The instant invention is concerned primarily with the disposition of the absorber overhead stream above mentioned, with separate alkylation of the DIPS and olefin contained in this stream provided.

To this effect, a separate alkylation reactor from the main alkylation reactor in the system is used to alkylate the DIPS and olefins from line 156, which represents the absorber settler overhead. It should be noted that this stream contains the purest DIPS produced in the absorption process and, because of the requirements for an excess of olefins in the absorption system, as set out in Massa Ser. No. 495,191, supra, this stream will also always contain some molecular olefin. Yet further, additional molecular olefin can be added to this stream by by-passing a portion of the propane-propylene feed directly to line 156 (the PP feed to the absorber section) which gives the alkylation reactor system operator control over the amount of molecular olefin alkylated with the alkyl sulfate.

Some authorities feel that acid strength has a bearing on the quality of alkylate produced from pure propylene. They generally feel that a higher acid strength promotes a high quality alkylate. I have, therefore, shown the DIPS alkylation contactor as providing the highest acid strength reactor in the alkylation reactor train or system.

Provision is further shown on the drawing for feeding the fresh acid separately to any contactor in the train. Thus, the acid strength in the DIPS reactor is also subject to independent control. In a specific operation, with particular product goals the optimum acid strength can be determined by experiment by the operation for the particular unit involved and, thereafter, the strength maintained at the desired value.

Early work in alkylation of propylenes indicated that a higher reaction temperature was required. Commercial experience has not particularly confirmed this theory, but the separate alkylation of DIPS and propylene from the absorber system overhead will permit independent temperature control which can be set for the optimum temperature for the particular plant involved.

The flow diagram of FIG. 2 illustrates a multiple alkylation reactor system with series acid flow modified by provision for fresh acid to each contactor, which permits the establishment of practically any desired acid strength profile at each contactor.

Basically, the propane-propylene feed from the catalytic cracker or other source will essentially all be fed to the SARP absorption system (FIG. 1). In certain specific cases, however, it may be desirable to adjust the propylene content of the overhead line from the SARP absorption system's second settler by by-passing fresh propane-propylene feed directly into this line before said feed gets into the alkylation reactor.

In other cases, where a very large proportion of the total olefin sent to the plant (alkylation and SARP) is propylene, it may be desirable, for balancing the load on the alkylation reactors, to send a portion of the propane-propylene feed to the alkylation reactors with the butane-butene feed.

It should be emphasized that in any case wherein alkyl sulfates are alkylated by isoparaffin, it is necessary that some molecular olefin be present in the reactor. The amount of molecular olefin required will depend upon the specific feed and operating conditions in a given reactor system and means for adjusting to the optimum are provided.

An object of the instant invention is to improve an alkylation reaction system which has a sulfuric acid recovery process associated therewith, by virtue of providing a separate alkylation reactor to handle the overhead from the absorption system (containing DIPS and propylene, as well as propane) in a separate alkylation reaction vessel, whereby the purest DIPS produced in the absorption process and a quantity of molecular olefin will be separately alkylated thereby to produce the most optimum alkylate product possible in said separate vessel.

Another object of the invention is to provide an alkylation reaction system having a sulfuric acid recovery process associated therewith wherein a plurality of other alkylation reactors is associated with an alkylation reactor which only alkylates the DIPS and the olefins from the overhead of the last settler in the sulfuric acid recovery absorption stage.

Another object of the invention is to provide an alkylation reaction system having a sulfuric acid recovery process associated therewith utilizing a plurality of alkylation reactors wherein one of the reactors, namely, that receiving the overhead from the SARP absorption step second settler, is controlled and controllable with respect to the relative amount of molecular olefin which is alkylated with the alkyl sulfates in said overhead by virtue of bypassing the propane-propylene feed to the SARP step as desired to the SARP overhead reaction feed.

Another object of the invention is to provide a sulfuric acid recovery process associated with a series of alkylation reactors, wherein one of said reactors receives the overhead from the settler in the SARP absorption step which has the purest DIPS therein and also some molecular olefin (as well as additional molecular olefin is desired) and wherein a higher acid strength is or may be provided to said alkylation reactor which has the DIPS and quantity of pure propylene fed thereto.

Another object of the invention is to provide a train of alkylation reactors which have a sulfuric acid recovery process associated therewith, wherein means are provided for feeding fresh acid separately to any contactor in the train, thereby to subject the acid strength in any reactor which may receive DIPS and free olefin from the absorption step of the SARP process to independent control. Thus, in operation, the optimum acid strength for one or more of the alkylation reactors in the system can be determined by experiment for the particular unit or system involved and the strength thereafter maintained at the desired value for each or every unit.

Another object of the invention is to provide a train of alkylation reaction vessels associated with a sulfuric acid recovery process in such manner that the overhead from the absorption settler having the purest DIPS and free propylene therein is passed to one of these reactors where independent temperature control is available to provide the optimum temperature for the particular reactors and the entire plant involved.

Another object of the invention is to provide an improved method for alkylating straight DIPS (dipropyl sulfates) in that additional free propylene is or may be provided to any or all alkylation reactors in an alkylation system which receives DIPS or dialkyl sulfates to alkylate.

Another object of the invention is to provide an alkylation reaction system utilizing a SARP process where fresh pure DIPS from the settler having the freshest purest DIPS are alkylated in a separate reactor in an improved manner, this manner including providing a quantity of free propylene or olefin with said fresh pure DIPS or DAS to such alkylation reactor.

Other and further objects of the invention will appear in the course of the following description thereof.

SARP SYSTEM IN FIG. 1

In FIG. 1 is shown an acid recovery system utilizing a two stage absorption phase with an extraction phase followed by an acid treatment step. Absorbers 1 and 2, seen at 140 and 141, are Stratco contactors of the type seen in Putney U.S. Pat. No. 2,979,308, issued Apr. 11, 1961, entitled "Apparatus for Controlling Temperature Change, etc." The extraction phase is preferably carried out in a rotating disc contacting vessel 142 and the acid treatment stage in a contactor of the type previously described at 143. Power means 140a, 141a and 143a drive the impellers in each of the respective contactors with power means 142 supplying drive for the RDC. Settling vessels are seen at 144 for the first stage absorber, 145 for the second stage absorber and 146 for the acid treater.

A preferably preponderantly propane-propylene feed is then input to contactor 140 at the first absorption stage through line 147. This is mixed in vessel 140 with the bottoms from the second stage absorber settler vessel 145 passed therefrom via line 148. The effluent of the No. 1 absorber is passed to settler 144 through line 146 and comprises primarily dialkyl sulfates, namely, dipropyl sulfate, perhaps a small percentage of monopropyl sulfates, normal paraffinic hydrocarbons of the propane level and an excess of olefinic hydrocarbons. No excess acid, in effect, is found at this stage, sufficient olefin being provided and sufficient mixing effected in the two absorbers that virtually all sulfuric acid in the input through line 148 to contactor 140 is reacted. There is a quantity of acid soluble polymeric contaminants and water in the settler 144 contents, as well.

The overhead from settler 144 is taken off through line 149 and passed to contactor 141 (No. 2 absorber) where it is met by an incoming stream of used alkylation acid via line 150. This material has come down into the acid recovery system via lines 151 and 152 through pump 153. Line 152 coming out of the alkylation system is line 137. The effluent from absorber No. 2, contactor 141, passes overhead through line 154 to settler No. 2 at 145. The bottoms from settler No. 1 at 144 are passed through line 155 over to the extraction phase of the acid recovery system.

To sum up the functional side of the absorption system, the used acid coming down through lines 137-152 goes into the No. 2 absorber where it meets the overhead from the No. 1 settler 144. Thus the original propane-propylene feed has already been depleted of a certain amount of olefin via what has been taken out in the No. 1 absorber. The reactor effluent from the No. 2 absorber 141 is thus acid rich and propylene poor. The bottoms from the No. 2 settler 145 have been stripped of excess normal propane, other light hydrocarbons and at least a slight excess of propylene (required to drive the absorption reaction to the dialkyl sulfate state). These light components and some much smaller percentage of alkyl sulfates dissolved therein are taken off overhead from the No. 2 settler through line 156.

Returning to the No. 2 settler, the bottoms therefrom, comprising acid-rich and propylene-poor absorption product, are passed via line 148 to absorber No. 1 at 140 where the already partially sulfated acid is moved strongly to the dialkyl side by the impact of the new propane-propylene feed input to the contactor through line 147. The effluent through line 146 has a considerable excess of propylene and light hydrocarbon. The settler 144 contents is stripped of the latter two through line 149 which passes to the No. 2 absorber 141. The ultimate absorption product, very preponderantly dialkyl sulfate, but also including any acid, water and acid soluble contaminants, is taken out line 155.

Indirect heat exchange of the absorption reactor steps at 140 and 141 is provided by flowing bottom hydrocarbons from flash drum 62 through line 138 to take-off lines 157 and 158 connecting to tube bundle headers 140b and 141b, respectively. After a heat exchange connection at 159, line 138a connects into return line 139 to flash drum 62. Return lines 157a and 158a from headers 140b and 141b connect into line 138a to complete the circuit through the tube bundles of absorbers 140 and 141. The entire absorber-settler system is maintained under sufficient pressure that all the reactants of the absorption step are maintained in liquid phase. The pressurization of this system is the reason for pump 153.

The reaction or absorption is exothermic, resulting in a rather high heat release at the point of reaction, thus cooling is required to maintain the reaction temperature at the desired level of approximately 30°–40° F. A significant portion of the dialkyl sulfate goes into solution in the hydrocarbon phase. Thus, after the reaction mix is withdrawn from the contactor and separated, a portion of the dialkyl sulfate leaves the separating vessel with the hydrocarbon phase. In the showing of FIG. 1, the return of the overhead from the No. 2 settler 145 into the alkylation system via line 156, is optimal.

Isobutane for extraction of the diisopropyl sulfate from the alkylation section is supplied through line 122 from fractionation recycle line 114 from deisobutanizer 109. After passing heat exchange at 159, this line passes to rotating disc contactor 142 or other suitable countercurrent flow extraction vessel. The heavy phase from the No. 1 absorber settle, through line 155 and line 162 passes to the other end of the RDC. In the RDC, the heavy phase undergoes continuous countercurrent extraction of isobutane. The bulk of the dipropyl sulfate, some monopropyl sulfate and traces of water and conjunct polymers dissolve in the isobutane stream and form the extract which leaves the top of the extractor vessel 142 through line 163. The remainder of the heavy phase, comprised of any unextracted dipropyl sulfate, some monopropyl sulfates, and the bulk of the water and acid originally present in the alkylation acid leaves the bottom of the extractor through line 164 and is withdrawn from the unit as spent acid.

The extract from the previous step flows to the acid treater contactor 143 through line 163 where it is brought into contact with a relatively minute amount of alkylation acid pumped from the No. 2 absorber feed stream through line 165. This acid picks up the traces of conjunct polymers dissolved in the extract. The reaction mix from acid treater contactor 143 flows via line 166 to settler 146 for phase separation and the treated extract from the settler 146 is returned to the strongest acid alkylation contactor for alkylation of the dipropyl sulfate and consequent strong acid release. This return is through line 167. The heavy phase from the acid treater settler 146 is recycle pumped through lines 168 and 169 by pump 170 for reextraction of any dipropyl sulfate picked up with the conjunct polymers.

Refrigeration is required on both absorber contactors and on the isobutane chiller 159. The refrigerant operating temperature requirements are typically in the 10° – 20° F. range. This can be supplied by the vaporization of hydrocarbon from the flash drum section of the effluent refrigeration system. Since the bulk of the refrigeration load is required for heat of reaction which normally is part of total alkylation reaction heat load, the total refrigeration duty is only slightly increased. Some shift in duty and some changes in vapor flow rates are encountered.

High degree of extraction efficiency is necessary for maximum recovery of propyl sulfates. Whatever dipropyl sulfate is present in the raffinate from this step represents an acid loss from the process. This loss should be minimized. A rotating disc contactor as seen in Reman U.S. Pat. No. 2,601,674, issued June 24, 1952 entitled "Liquid Contact Apparatus, etc." is here used as the extractor, operating with a hydrocarbon phase continuous. The extractor is designed to operate liquid full at a temperature the same as or slightly below the alkylation reactor temperature. Little or no heat is generated in the extractor, so temperature control may be effected by chilling the isobutane feed stream. The pressure in the extractor and the following acid treater system is allowed to float with the alkylation reactor pressure.

With respect to the acid treating step, the purpose is to scavenge traces of conjunct polymeric compounds or "acid oil" from the extract with a small amount of alkylation acid.

At the same time, efficient interfacial contact is required for the necessary degree of scavenging. A Stratco contactor is used for this step, preferably. The heat of solution generated in this step is so small compared to the volume of extract that no heat transfer surface is provided in the contactor. A slight sub-cooling in the extraction step may be employed to insure that the treated extract will leave the treater settler at essentially the alkylation reactor temperature.

The overhead line 156 from settler 145 has a valve thereon which is 156a. Prior to valve 156a, alternative No. 2 settler overhead take-off line 300 may be employed. The latter has valve 301 and back pressure valve 302 thereon whereby the light phase overhead from settler 145 may be passed alternatively through valve control lines 303 and 304 to either acid treater 143 or RDC 142.

In the systems contemplated in FIG. 1, utilizing either overhead line 156 directly passing settler 145 overhead to the alkylation reaction zone or line 300 passing same to the RDC or acid treater, it is contemplated that both olefin and alkyl sulfates values in the settler 145 overhead would be conserved. These systems emphasize the maximum utilization of acid, but not particularly the total conversion of propylene by reaction with acid. Rather, the recovery of propylene by direct alkylation in the alkylation reaction step is visualized. Also, in the system of FIG. 1, it is contemplated that a richer propylene or olefin feed addition to absorber 140 through line 147 will be utilized, rather than a leaner propylene mixture.

The acid treating step shown in FIG. 1 is optional. In a two-step absorption section as shown in FIG. 1, where there is relatively little propylene overhead from settler 145 to be used in one of the manners seen in FIG. 1 (e.g., passage to acid treater), the acid treater at 143 is less valuable and thus is less attractive.

It is necessary, in any absorption system of a sulfuric acid recovery process that at least certain portions of the overhead from the settler stage terminating the absorption section (through line 156 in FIG. 1) be retained in the system so that the sulfate values (as well as any olefinic hydrocarbon in the overhead from settler 145) in the system of FIG. 1 be retained in the system.

If it is desired that the acid treater stage be omitted from the system, the line 163 from the RDC would run directly into 167, thus returning to the alkylation reaction zone. Bottoms from the RDC through line 164 would still be spent acid.

It is also feasible to utilize a one-stage absorption system, where, necessarily, the absorption phase of the acid recovery system must be operated olefin-rich whereby there will be a more considerable excess of olefin in the absorption settler overhead and a lesser percentage-wise production of dialkyl sulfates. In this case, it is most and very essential that the sulfate and olefins in the overhead from the absorber settler be conserved in the system.

In the event that the overhead from the absorber settler is from a single absorber vessel and settler vessel system, it is useful to divide the absorber settler overhead between a direct recycle to the alkylation reaction zone and a feed to (1) the RDC, (2) the acid treater, or (3) both. In the latter manners, the propylene is maintained in contact with all acid values to minimize the quantity of alkyl sulfates produced and thereby maintain the reaction in the absorption section in the direction of producing dialkyl sulfates or in the direction of the dialkyl equilibrium. Likewise, any sulfate values in the absorber settler overhead are conserved in any one of these variations of the system and are recycled to the alkylation reactor either from the acid treater settler overhead, if the acid treater is present in such single absorber vessel-settler vessel absorption step in the SARP process, or from the RDC output (equivalent to line 163 in FIG. 1).

Such a single stage absorption system utilizing a rich propylene (paraffin poor) feed to the absorption step may be highly recommended under certain circumstances, with the overhead from the single absorption settler containing a substantial percentage of unreacted olefin and with a relatively direct passage of same to the alkylation reaction step being desirable. Where a time tank system is utilized, such a single stage absorption apparatus featuring complete recovery of the excess olefins and also sulfate values in the light phase from the absorption step and alkylation and, by virtue of the driving force of the high olefin content in the absorption step, the best conditions for acid utilization.

Referring to FIG. 1, the back pressure valves seen in this figure on line 156 and connecting line 300 thereto, serve to maintain the illustrated absorber section or absorber contactors and associated settlers in said section under such pressure that all flowing materials in the absorber section are maintained in liquid phase. While it is possible to produce alkyl sulfates in either liquid or vapor phase, liquid phase operation is much preferred for the maximum production of the dialkyl sulfates. In the liquid phase reaction, the absorption of propylene is quite rapid and relatively high yields are obtained in a relatively short time. In either phase, efficient contacting, relatively short reaction time and isothermal conditions are important for the latter.

Several variations of conserving valuable materials in the absorption step light phase (such as excess olefin if present and alkyl sulfates dissolved in light hydrocarbons) may be utilized, depending upon the apparatus complex desired. A system as in FIG. 1 which utilizes both a multiple stage absorber section in the SARP section and an acid treater and a system which utilizes but a single absorption stage in the SARP section with an acid treater are preferred when the absorber system is operated with olefin in the absorber system light phase. Whether the absorption light phase goes directly to alkylation or passes thereto via the RDC (extractor section) or acid treater in whole or part, the olefin and alkyl sulfate values are conserved in the alkylation reaction zone in all cases. The presence of olefin from the absorber light phase in the RDC or acid treater affords the maximum exposure of acid values to olefin for reaction to dialkyl sulfate and, additionally, provides throughout the entire system a driving force to shift the reaction equilibrium toward dialkyl sulfate production.

A contacting device can be provided which accomplishes, in a single vessel, a countercurrent flow of acid and hydrocarbon feeds and incorporates or provides, by virtue of its design, multiple reaction stages or zones. In essence this is a rotating disc contactor having a lower level input line for incoming hydrocarbon with greatest propylene strength, an upper level input line for used alkylation acid, an upper level (above the latter line) outlet for an absorption light phase, and an output line from the vessel below the first described line for output of a heavy phase which has been maximally converted to dipropyl sulfate.

We have attempted to alkylate propyl sulfates and a mixture of propyl sulfates and propylene in a test unit. The unit operation for a limited period and the material balance of 6 hours of operation on a mixture of propyl sulfate and propylene are shown on the attached tables.

These data tend to indicate that a straight propyl sulfate will not successfully alkylate and that some fresh olefin is required to properly control the reaction. Thus, while charging straight propyl sulfates, the acid strength continued to decrease. After the addition of propylene to the alkylation reactor, the acid strength in the system continued to increase from the low of 87.9 percent at 1:30 a.m. and 3:30 a.m. to a high of 90.6 percent at the termination of the run. All during the period in question, the quantity of propyl sulfates charged to the alkylation reactor remained constant.

Run No. 1 acid recovery unit 100% propylene operation 36SD1

Unit log of operations

| | | |
|---|---|---|
| 8-10-64 | 8:10 p.m. | Ran out of BB and water entered alkylation reactor. Shut off BB line and continued to feed recycle DIPS from acid recovery unit to reactor. |
| | 9:00 p.m. | Recycle acid strength 89.6% vs. 91.5% at 6 p.m. Added 7.2 lbs. of fresh acid by batch. |
| | 10:00 p.m. | Running alkylation unit on DIPS only. Recycle acid 88.6% strength. Began adding |

Run No. 1 acid recovery unit 100% propylene operation 36SD1

|  |  |  |
|---|---|---|
| 11:00 p.m. | | fresh acid at rate of 2.2 lbs./hr. Recycle acid strength 89.5%. |
| 8-11-64 | 12:00 p.m. | Reduced fresh acid input to 1.0 lbs./hr. |
|  | 12:15 a.m. | Recycle acid strength 89.0%. |
|  | 1:00 a.m. | Reduced fresh acid input rate to 0.7 lbs./hr. |
|  | 1:30 a.m. | Recycle acid strength 87.9%. |
|  | 2:00 a.m. | Increased fresh acid makeup to 1.3 lbs./hr. |
|  | 2:30 a.m. | Started PP feed into alkylation reactor at rate of 35 cc./min. |

Critical point

|  |  |
|---|---|
| 3:30 a.m. | Recycle acid strength 87.9%. |
| 5:30 a.m. | Recycle acid strength 88.6%. |
| 6:00 a.m. | Increased PP feed rate to 67 cc./min. |
| 7:00 a.m. | Recycle acid strength 89.1%. |
| 11:30 a.m. | Recycle acid strength 90.6%. |
| 12:00 noon | Unit shutdown. |

[Run No. 1—Acid recovery unit 100% propylene operation 36SD1]

August 11, 1964, 6:00 a.m.—12:00 noon

Alkylation unit balance

| Component | From acid recovery unit, cc./min. | PP feed direct to reactor, cc./min. | Isobutane to reactor, cc./min. | Total reactor feed, cc./min. | Total reactor effluent, cc./min. |
|---|---|---|---|---|---|
| C₂ | | 0.33 | | 0.3 | 0.3 |
| C₃⁼ | 23.78 | 35.18 | | 59.0 | |
| C₃ | | 28.48 | 3.1 | 31.6 | 31.6 |
| iC₄ | 213.60 | 3.01 | 301.4 | 518.0 | 442.5 |
| C₄⁼ | | | | | |
| nC₄ | | | 8.5 | 8.5 | 8.5 |
| iC₅₊ | | | | | 105.0 |
| Total | 237.38 | 67.00 | 313.0 | 617.4 | 587.9 |

Alkylation factors:
|  |  |
|---|---|
| Temperature, °F | 50 |
| I/o ratio on reactor feed | 8.8 |
| Percent iC₄ on total effluent | 75.3 |
| Percent diluents on feed (C₃-nC₄) | 6.5 |
| Space velocity (50% acid in reactor) | 0.19 |
| Fresh acid consumption uncorrected for increasing inventory strength, lbs./gallon | 0.78 |

Alkylate production identification drum #26 octanes

| F-1 | Clear | 90.6 | F-2 | Clear. |
|---|---|---|---|---|
| F-1 | Plus 3 cc | 102.8 | F-2 | Plus 3 cc. |

ASTM distillation (weathered sample) by Texaco

| Percent | °F. | Percent | °F. |
|---|---|---|---|
| IBP | 99 | 70 | 212 |
| 5 | 151 | 80 | 229 |
| 10 | 173 | 90 | 323 |
| 20 | 191 | 94 | 386 |
| 30 | 196 | EP | 386 |
| 40 | 198 | | |
| 50 | 201 | Residue | 0.8 |
| 60 | 205 | Recovery | 93.8 |
| | | Room temp | 87 |
| | | Barometric | 735 mm. |

Referring to FIG. 2, therein is shown an alkylation reaction system utilizing three alkylation reactors ($R_1$, $R_2$, and $R_3$), each having a separate settler, ($S_1$, $S_2$ and $S_3$). Because of limitations in space in the drawings, FIG. 2 is shown as coupling with the sulfuric acid recovery system (SARP) of FIG. 1 via a block schematic. FIG. 2 also couples with the effluent refrigeration and fractionation systems of FIG. 3, but, again, because of space limitations in the drawings, the alkylation system of FIG. 2 is shown as a block with respect to FIG. 3 and, also in FIG. 3, the SARP system of FIG. 1 is shown as a block.

Referring, then, to FIG. 2, the first alkylation contactor 300 is powered by motor 301. It also has a cooling tube bundle schematically indicated at 302. The feed to contactor 300 comprises, through line 156, the overhead from settler 145 of FIG. 1, namely, propane, propylene and DIPS. The DIPS and propylene are about 50—50, exclusive of propane. Additional propylene to that input through line 156 from the SARP system may be inserted from line 303, from the propane-propylene (P—P) feed of line 147 to the SARP system, line 303 dividing into lines 304 and 305. The additional propylene which may be added as desired to line 156 comes from line 304. The isobutane recycle from trap and flash drum 62 via line 86 is input to vessel 300 via line 306.

Thus, the purest DIPS in the entire system, namely, the overhead DIPS from settler 145, excess propylene from the SARP system, additional propylene from line 304, as desired and isobutane from line 306 are passed into the alkylation reactor 300 to be mixed and alkylated in the manner seen and described in the Putney U.S. Pat. No. 2,979,308, issued Apr. 11, 1961, for "Method and Apparatus for Controlling Temperature change . . . ." Fresh acid is input to the system from line 307 which divides into lines 308 and 309. From line 308, which is joined by acid recycle line 310 from the first settler 311, line 312 passes acid to the alkylator 300 whereby the isobutane, olefins and DIPS alkylate in the presence of the sulfuric acid catalyst. Reaction effluent is taken off from alkylator 300 via line 313 and passed to the first settler 311. The acid phase from settler 311 is removed from the bottom of settler 311 via line 310 and a portion thereof is diverted to reactor 324 via line 314. The hydrocarbon phase of the effluent is taken off the top of settler 311 through line 315 of reactor 300, the effluent from the tube bundle 302 taken off via line 318 to join line 361 (see FIG. 3, center), to pass to trap or flash drum 362.

Thus it is seen that, in the first alkylation reactor 300, the purest DIPS from the SARP system, the overhead propylene from the SARD system, additional propylene, if desired, recycle isobutane and fresh acid, with or without recycle acid from settler 211, are alkylated in reaction 300. Note that fresh acid alone may be used in this particular contactor to give the optimum desired results. Isobutane recycle from fractionation via line 414 may join line 156.

Referring now to the second alkylation reactor 320, the recycle DIPS stream from either acid treater settler 146 via line 167 or, if an acid treater is not used, recycle DIPS from the overhead from RDC 142 through line 163 is passed through line 321 to join line 322 going into reactor 320. Reactor 320 is driven by power source 323 and has tube bundle 324 served by header 325. The isobutane recycle from trap 362 via line 326 may join the DIPS recycle from the SARP unit input through line 322 from line 326. Likewise, isobutane recycle from fractionation in FIG. 3 via line 414 may additionally be added to the reactor via line 327 joining line 328 to the reactor. The butane-butene (B—B) feed input to the system through line 116 feeds line 328 via line 329. New isobutane is input to line 116 and the alkylation system via line 330. Thus, B—B feed and isobutane go in through line 329 and 328 to reactor 320.

The reaction effluent from reactor 320 is taken off overhead through line 330 to the second settler 331. Recycle acid from settler 331 is via line 332 which may join line 314 from settler 311, common line 333 taking both recycle acid and stage acid to the reactor 320. Fresh acid via lines 307, 309 and 309a may go to reactor 320 via line 333.

The hydrocarbon phase effluent from settler 331 is taken overhead through line 334 and passed in effluent refrigeration through line 336 to header 325, said hydrocarbon phase, after going through tube bundle 324, passing overhead via line 336 to join common line 361 to the trap and flash drum.

Referring to the third alkylation reactor 340, this is driven by motor 341 and has tube bundle 342 served by header 343. B—B feed and isobutane from lines 116 and 330, respectively, pass into reactor 340 via line 344. This B—B feed and isobutane may be enhanced with isobutane recycle from fractionation through line 345 from line 414 out of the top of the deisobutanizer 109. Isobutane recycle from the trap via line 386, joined by DIPS from lines 163 or 167 input through line 346 go into the reactor vessel 340 through line 348 to the third settler 349. Recycle acid from settler 349 is taken off the bottom thereof via line 350 which passes in recycle to vessel 340 through line 351 with optional additional acid through line 337. The hydrocarbon phase from settler 349 is taken off through overhead line 352 and after passing back pressure valve 353 goes through tube bundle 342 through header 343 and out overhead line 354.

Lines 354, 336, and 318 join together in a common line 361 which passes to the trap and flash drum 362.

Fresh acid may also be added to contactor 340 via lines 307, 309, 337 and 351. A portion of the acid phase from settler 349 is taken to the SARP system through lines 350 and 137.

Referring to FIG. 3, from the upper portion of header line 361 carries the hydrocarbon phase effluent, both liquid and vapor, to trap and flash drum 362. Drum 362 has a divider 363 centrally thereof which divides the liquid inside thereof but permits communication thereover internally of the vessel for vapor phases from both sides of the trap.

Vapor overhead from trap 362, comprising light excess isoparaffinic hydrocarbons and normal paraffinic hydrocarbons are taken off through line 364, passing to compressing stage 365 and condenser 366 and thence via line 367 to accumulator 368. Liquid from accumulator 368 may pass through line 369 through valve 370 back to trap 362 or, alternatively, bottoms liquid is taken off through line 371 via pump 372 through a heat exchange step at 373 to depropanizer tower 374. The overhead from tower 374 is taken off through line 375 through cooler 376 and to vessel 377. Overhead from vessel 377 goes out of the system through line 378 as propane, with the bottoms returned to tower 374 as reflux via pump 380 and line 379. The bottoms fraction from tower 374 are withdrawn through line 381 through heat exchange at 373 and through cooling step 382 and valve 383 to the bottoms of trap 362. Reboiling takes place via line 384 heated at 385.

The trap and flash drum bottoms on the left hand side of the trap and flash drum in the view are linked with the acid recovery system, but are returned and handled with respect to the alkylation reaction and associated systems via line 86, pump 387, valve 388 controlled by level control 389. Line 386 returns the trap bottoms, largely comprising unreacted isoparaffinic hydrocarbons, to the three alkylation reactors 300, 320 and 340 of FIG. 2.

On the right hand side of barrier 363 in the view, trap bottoms are returned into the system via line 390 through pump 391 and valve 392 controlled by level control 393. From valve 392, the trap bottoms are passed via line 393 through heat exchange at 394 to meet line 395 passing to a caustic wash step at 396 with a receiving vessel at 397. From vessel 397, recycle line 398 splits into line 399 out of the system and line 400 which, via pump 401, returns the caustic wash bottoms through the mixer 396. Fresh caustic is input to the system through line 400a. Overhead from the caustic operation passes the alkylate through line 402 and mixing step 403 after input of fresh water at line 404 to vessel 405. Bottoms from 405 go out of the system at line 406, with the overhead passed through line 407 and via heating step 408 to deisobutanizer tower 409.

The overhead from tower 409 is taken off through line 410, condensed at 411 and passed to vessel 412. Liquid from vessel 412 passes via line 413 to the tower as reflux and to fractionation recycle line 414 via cooler 415 and heat exchange at 394 to the three alkylation contactors through line 114 as seen in FIG. 2.

Part of the fractionation recycle may be diverted to the acid recovery system through line 122 after cooling at 415, as described for FIG. 1.

Reboiling in the deisobutanizer tower is seen at 423 with heat applied and 424. Bottoms from the deisobutanizer tower are passed via line 425 to debutanizer tower 425a. The overhead from the latter is taken off through line 426 through condensing at 427, accumulation at 428 and recycle for reboiling through line 429 through pump 430. Normal butane is removed from the system through line 431. Bottoms from debutanizer tower 425a go out of the system through line 432 after condensation at 433 with reboiling of the lower fraction of the achieved at line 434 with heat applied at 435.

We claim:

1. In a combination process wherein olefin is reacted in an absorption zone with used sulfuric acid alkylation catalyst from an alkylation reaction zone, referred to hereinafter, yielding an absorption zone overhead phase comprising unreacted olefin, light parraffin hydrocarbon and a portion of dialkyl sulfate formed in said absorption zone and a heavier acid phase including dialkyl sulfate, said phases are separated, said acid phase is extracted with isoparaffin yielding a dialkyl sulfate-isoparaffin extract solution and a raffinate acid, and said dialkyl sulfate-isoparaffin extract solution is passed to said alkylation reaction zone, the improvement wherein said overhead phase and isoparaffin are charged to a separate alkylation reactor wherein said charged isoparaffin is alkylated with said dialkyl sulfate in said overhead phase.

2. The process of claim 1 wherein olefin hydrocarbon of the same type comprising the dialkyl sulfate in said overhead phase is charged to said separate alkylation reactor.

* * * * *